Dec. 13, 1955 K. SINGER 2,727,096
ANTI CROSS-TALK MULTITRACK MAGNETIC SOUND SYSTEM
Filed Aug. 28, 1952
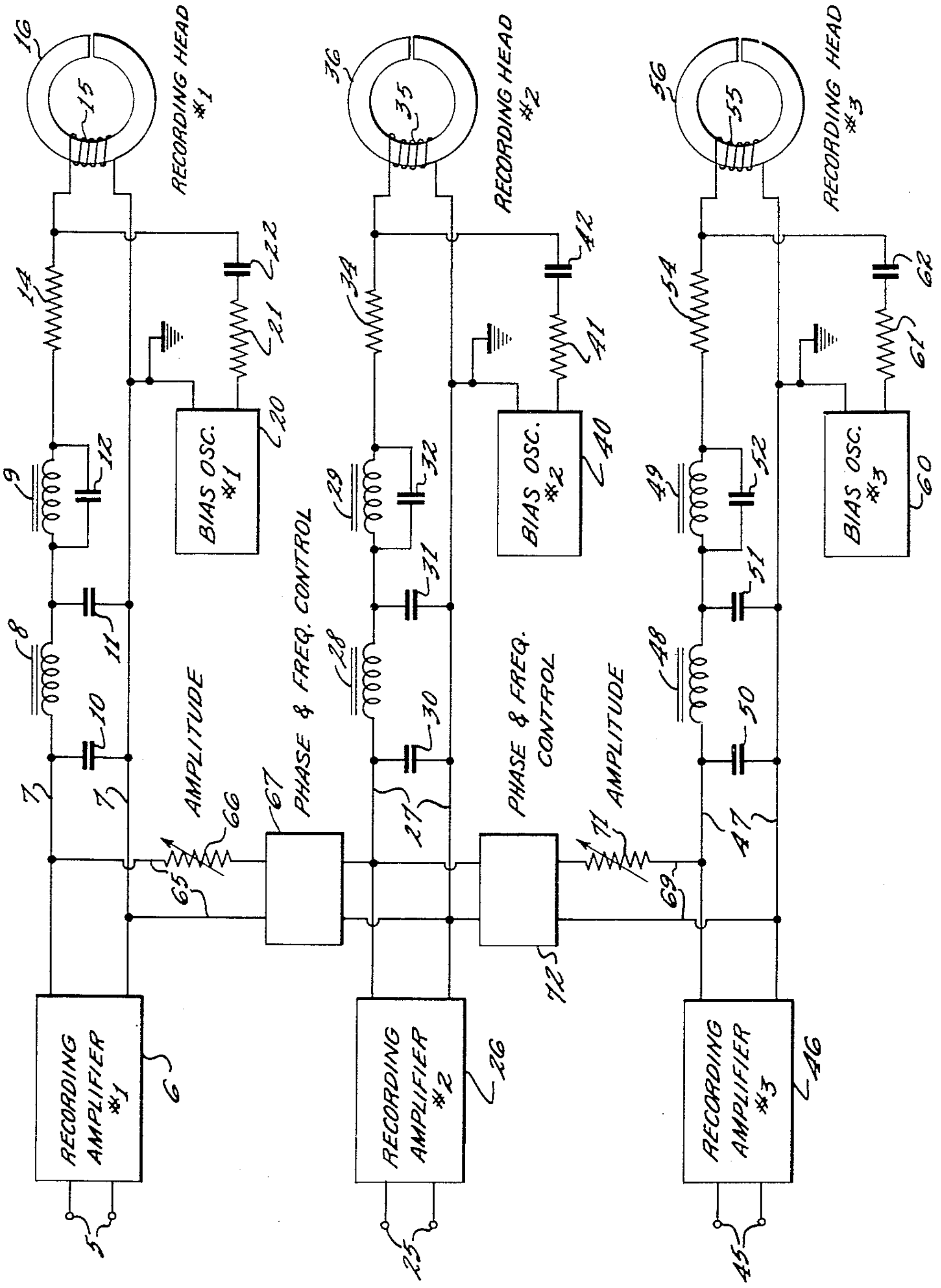
INVENTOR.
Kurt Singer
BY [signature]
ATTORNEY.

United States Patent Office 2,727,096 Patented Dec. 13, 1955

2,727,096

ANTI CROSS-TALK MULTITRACK MAGNETIC SOUND SYSTEM

Kurt Singer, North Hollywood, Calif., assignor to Radio Corporation of America, a corporation of Delaware Application August 28, 1952, Serial No. 306,801

8 Claims. (Cl. 179—100.2)

This invention relates to sound recording and reproducing systems, and particularly to multi-track magnetic sound recording and reproducing systems.

It has been found desirable in the recording of sound records on magnetic film or tape to record several parallel tracks adjacent one another longitudinally of the film. These tracks may contain different portions of the same signal, or they may contain three different signals, such as dialogue, music, and background effects. In the recording of such a multi-track system, multiple heads mounted coaxially, transversely to the film or tape are employed, such a form of head arrangement and mounting therefor being disclosed and claimed in Pettus U. S. application, Ser. No. 230,403, filed June 7, 1951, now Patent No. 2,644,856, granted on July 7, 1953.

Because of the high frequency leakage flux which couples one recording head to adjacent recording heads and the low frequency fringing flux which will record in adjacent tracks during the recording operation, it has been found that the signal being recorded can be heard on adjacent tracks, when no signal has been recorded thereon, at a level of approximately fifty decibels lower than the level of the track being recorded. This is referred to as cross-talk. This is found to be true in track areas immediately adjacent the recorded track, but the level is too low to be detectable on other track areas. However, the levels of the cross-talk signals recorded on adjacent tracks are too high for commercial use, and the present invention, therefore, is directed to a system for canceling or neutralizing the unwanted signals in adjacent tracks.

The cancellation or neutralization of the signal is accomplished by simultaneously impressing on the recording heads for adjacent track areas a correcting signal in 180 degrees phase reversal to the leakage flux signal, by either changing the polarity of the adjacent recording heads or introducing a 180-degree phase shift in a signal impressed on the circuits of adjacent channels. By this method, it has been found that cancellation of the high frequency leakage flux between heads and the low frequency fringing flux in the film is obtained. Therefore, upon reproduction of adjacent tracks, no spurious signals are present.

The principal object of the invention, therefore, is to facilitate the recording of multi-track magnetic sound records.

Another object of the invention is to provide an improved multi-track magnetic sound recording and reproducing system.

A further object of the invention is to provide a multi-track magnetic sound recording system in which a correcting signal for neutralizing a cross-talk signal is provided.

A still further object of the invention is to provide an improved multi-track magnetic recording system in which a signal being recorded in one position with a recording head is impressed in phase opposition on adjacent recording heads.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single figure is a combination block diagram and schematic circuit of a system embodying the invention.

Referring now to the drawing, a signal source, which may be a microphone, phonograph record, or other form of signal source, is connected to terminals 5 feeding a recording amplifier 6, which may be in channel No. 1. The output of the amplifier 6 is fed over conductors 7 through a bias isolating filter composed of inductance coils 8 and 9 and condensers 10, 11, and 12, after which the signal is fed over a constant current resistor 14 to the winding 15 of a magnetic recording head 16. The remaining portion of the channel is composed of a bias oscillator 20 connected across the winding 15 through a series resistor 21 and a condenser 22.

The second recording channel is similar to the one just described, the input being at 25 to amplifier 26 and connected over conductors 27 to inductances 28 and 29 and condensers 30, 31, and 32. This channel also has a constant current resistor 34 and winding 35 on a head 36. A bias oscillator 40 is connected to winding 35 over a series resistor 41 and a condenser 42. A third recording channel has an input at 45 connected to a recording amplifier 46 which is connected over conductors 47 to inductances 48 and 49 and condensers 50, 51, and 52. The channel is then connected over a constant current resistor 54 to the winding 55 of the recording head 56. Channel 3 has a bias oscillator 60, series resistor 61, and condenser 62 for connecting the oscillator to the winding 55.

In the past, the three channels were entirely independent of one another, and the three heads were in contact with the magnetic film at their respective gaps. However, during the recording of any one signal, there was also recorded in an adjacent track or tracks a signal with a level approximately fifty decibels below the level of the signal being recorded. This spurious signal was caused by flux coupling between adjacent heads, particularly in the high frequency region of the signal, and by flux fringing in the film in the low frequency region of the signal. Thus, recording head 16 would record a low level signal in the track of recording head 36 and recording head 56 would also record a low level signal in the track area of recording head 36. The central recording head 36 would record a low level signal in the track areas of both recording heads 16 and 56. Thus, upon reproduction, the signal of adjacent channels would be heard at a low level.

To prevent these low level signals from being recorded by the leakage flux, the three channels are interconnected, as shown in the drawing. That is, by conductors 65 over an amplitude control resistor 66 and a frequency characteristic and phase control unit 67, conductors 7 of channel 1 are connected to conductors 27 of channel 2. When these channels are so connected and the signal impressed on the winding 35 is in reverse polarity to that of the signal impressed on winding 15, the flux produced by the signal over conductors 65 will neutralize or cancel the leakage flux from head 16 when the amplitude of the signal in conductors 65 is adjusted to the correct value by resistor 66. Thus, no leakage flux signal will be recorded in the track area of recording head 36. If it is preferred not to change the polarity of the winding 35, an additional 180-degree phase shifter may be used in unit 67.

A similar interconnecting circuit is shown between conductors 47 and 27 and having conductors 69, an amplitude control 71, and a phase and frequency characteristic control unit 72. Thus, the leakage signal from head 56 will be neutralized by impressing the signal at the correct amplitude on head 36, 180 degrees out of phase with the signal on head 56. If a signal is being recorded in the central track area by head 36, a signal of reverse phase will be impressed on both heads 16 and 56 over conductors 65 and 69, respectively, to neutralize the leakage flux signal from head 36.

The above system, therefore, permits signals to be recorded either separately or simultaneously in the three parallel tracks longitudinally of the film at any desired level without the recording of a spurious signal caused by leakage flux between heads and through fringing flux on the film in adjacent track areas.

I claim:

1. An interference preventing system for a multi-track recorder adapted to record on a magnetic film signals from a plurality of signal sources, said system comprising a plurality of magnetic recording heads arranged to contact said film and to record said signals in a corresponding plurality of tracks longitudinally of said film, a corresponding plurality of bias oscillators, a corresponding plurality of independent signal channels, each of said channels being connected to a different one of said heads and to a different one of said bias oscillators and having an input for connection to a different one of said signal sources, said channels being so related that a leakage signal in any one of said channels is impressed on the recording heads of adjacent channels and on the film track areas scanned by said adjacent channel heads, a bias isolating filter in each of said channels, and means for simultaneously impressing the same signal at substantially the same level as said leakage signal in a reverse phase on said adjacent channel heads, said means being connected to said channels between said channel inputs and said filters.

2. An interference prevention system in accordance with claim 1, in which said last mentioned means are interconnecting circuits between adjacent channels, said circuits including a phase and frequency characteristic control unit, and an amplitude control unit.

3. An interference prevention system in accordance with claim 2, in which said channels include amplifiers and said circuits are connected between the outputs of said amplifiers in adjacent channels.

4. An interference prevention system in accordance with claim 1, in which the connections to said adjacent channel heads are reversed from the connections in each said channel to its own recording head.

5. A cross-talk eliminating system for a multi-track magnetic recorder and reproducer adapted to record on a magnetic film signals from a plurality of signal sources and to reproduce such signals from said film, said system comprising a plurality of magnetic recording heads arranged coaxially for contact with said film transversely thereof to record said signals on said film in a plurality of parallel magnetic sound tracks longitudinally of said film, a corresponding plurality of bias oscillators, a corresponding plurality of independent recording channels each connected to a different one of said heads for impressing a signal in each of said channels on the respective said heads, each of said channels having an input for connection to a different one of said signal sources and each said channel being connected to a different one of said bias oscillators, said channels each including a bias isolating filter between its said input and its said bias oscillator, and means interconnecting adjacent channels for impressing a portion of the signal in each channel on the channels adjacet thereto in 180-degree phase relationship to said first signal impression, said means being connected at points in said channels between said inputs and said filters.

6. A cross-talk eliminating system in accordance with claim 5, in which said interconnecting means includes means for varying the phase and frequency characteristic and amplitude of the signals impressed on said adjacent channels.

7. A cross-talk eliminating system in accordance with claim 5, in which said channels are so related that a leakage signal in any one of said channels is impressed on the recording heads of adjacent channels and in which said last mentioned means includes means for reversing the phase of said signals with respect to the leakage signal from said adjacent channel heads.

8. A cross-talk eliminating system in accordance with claim 5, in which an amplifier is provided in each of said channels, said interconnecting means between adjacent channels being connected to the outputs of said amplifiers.

References Cited in the file of this patent

FOREIGN PATENTS 457,282 Germany -------------- Mar. 12, 1928